Aug. 12, 1947.  KUAN-HAN SUN  2,425,403
FLUOGERMANATE GLASS
Filed Jan. 29, 1946

KUAN-HAN SUN
INVENTOR

BY *Newton N. Perrins*

ATTORNEY

Patented Aug. 12, 1947

2,425,403

UNITED STATES PATENT OFFICE 2,425,403

FLUOGERMANATE GLASS

Kuan-Han Sun, Rochester, N. Y., assignor to Eastman Kodak Company, Rochester, N. Y., a corporation of New Jersey Application January 29, 1946, Serial No. 644,180

6 Claims. (Cl. 106—47)

This invention relates to optical glasses having desirable and novel properties. More specifically, it relates to glass having an index of refraction for the D line ($n_D$) in the region above 1.7 and an Abbe value ($v$) between 24 and 28. Such a glass may be made by the use in certain proportions, predominantly, of alkali fluoride or fluorides, preferably sodium or potassium, titanium oxide, and germanium oxide.

Figure 1:
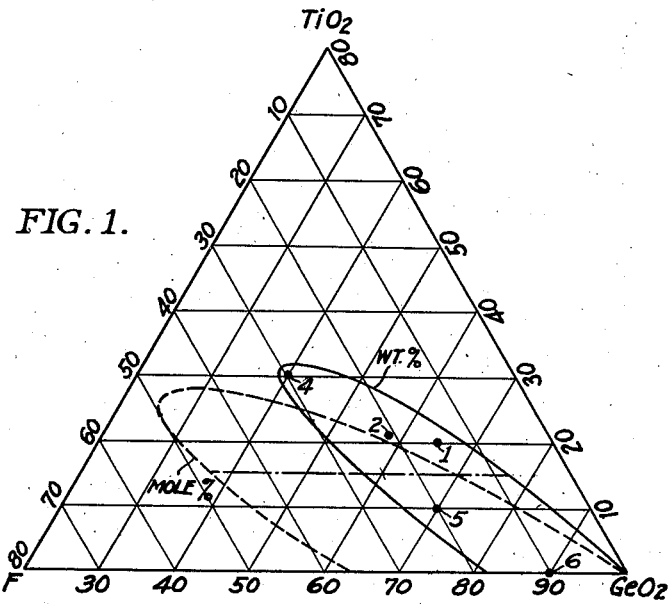
Figure 2:
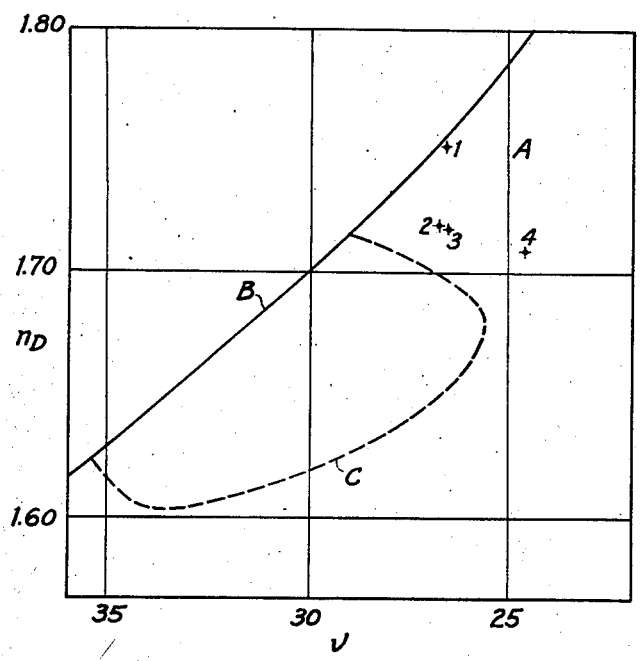

Reference will be made to the accompanying drawing, wherein Fig. 1 is a diagram showing the proportions of the ingredients useful in glass formation, and Figure 2 is a diagram showing the optical properties of the glasses.

In general, the composition of the glasses may be represented by the system $RF-TiO_2-GeO_2$, where R represents an alkali, preferably sodium or potassium. The proportions in which these constituents may be combined successfully to form a glass is found in practice to be limited. They cannot be combined in all proportions.

It has long been known that germanium oxide is a glass former, and its use instead of silica has been suggested. But it has not been previously known that when used in prescribed proportions in certain formulas or systems, the resulting glass had novel optical properties.

The approximate limits in which glass formation is attained is indicated in the following general formula, in which the ranges of the per cent by weight and by mole are given:

Table I

|  | Mole Per Cent | Weight Per Cent |
| --- | --- | --- |
| NaF | 0–50 | 0–32 |
| $TiO_2$ | 0–28 | 0–32 |
| $GeO_2$ | Over 24 | Over 38 |

Figure 1 shows for the above system, in a ternary diagram, the limits of the region of glass formation, both in weight and mole per cent, by full and dotted lines, respectively. The boundary lines indicated are empirical and do not indicate a sharply defined boundary under all conditions, since glass formation is a function of experimental conditions such as the size of the melt, rate of cooling, shape of the final glass piece, and other operating factors.

The above table shows the whole region of glass formation, which in itself is limited. But glass in only a certain portion of that region has outstandingly novel properties. This will be evident from a study of the data appearing hereinafter.

Specific examples will now be given, within the ambit of the general formula given above, parts being given by weight and molar proportions designated W and M respectively.

TABLE II

| Example No. | KF | | NaF | | $TiO_2$ | | $GeO_2$ | | $n_D$ | $\mu$ | $n_F-n_C$ |
| --- | --- | --- | --- | --- | --- | --- | --- | --- | --- | --- | --- |
| | W | M | W | M | W | M | W | M | | | |
| 1 | | | 15 | 29.0 | 20 | 20.4 | 65 | 50.6 | 1.7521 | 26.6 | 0.02831 |
| 2 | | | 21 | 38.0 | 21 | 20.0 | 58 | 42.0 | 1.7198 | 26.7 | .02692 |
| 3 | 21 | 30.4 | | | 23 | 24.3 | 56 | 45.1 | 1.7176 | 26.5 | .02705 |
| 4 | | | 30 | 48.5 | 30 | 25.5 | 40 | 26.0 | 1.7085 | 24.6 | .02880 |
| 5 | | | 20 | 37.5 | 10 | 9.8 | 70 | 52.7 | 1.6681 | 33.3 | .02009 |
| 6 | | | 10 | 21.7 | | | 90 | 78.3 | 1.6530 | 41.9 | .01559 |

Although NaF and KF are used separately, it is apparent that glasses can be made by incorporating a mixture of the two.

From a comparison of the optical properties given above, and as shown graphically in the chart of Figure 2, it will be seen that if the proportion by weight of either the fluoride or titanium oxide falls below 15 per cent, the optical properties of the glass fall in a region where cheaper commercial glasses are now available. I have, however, discovered that if in Table I 15 is substituted for zero as the lower limit of the amounts of the substances mentioned, the resulting glass has the desired novel optical properties. While glass is formed throughout the area and has useful partial dispersion properties, it is most valuable in the more limited region above the dot-dash line in Figure 1.

For certain of the glasses made by the examples of Table II, the partial dispersion between the lines of the spectrum, as indicated, are as follows:

Table III

| Glass No. | $n_h-n_g$ | $n_g-n_F$ | $n_F-n_D$ | $n_e-n_C$ |
| --- | --- | --- | --- | --- |
| 2 | 0.01476 | 0.01644 | 0.01942 | 0.01408 |
| 3 | .01488 | .01654 | .01953 | .01414 |
| 4 | .01629 | .01789 | .02083 | .01499 |

Figure 2 shows the charted positions of $n_D$ and $v$ for the examples given. These fall in area designated A. For comparison with other glasses, the line B shows the approximate limit of available commercial flint glasses, and area C, the field of fluosilicate glasses.

In making these glasses, anhydrous raw materials should be used. The batch may be mixed uniformly and introduced into a covered platinum or Vycor crucible. The melting temperatures of these glasses vary with systems and compositions. About 1100° to 1300° C. are sufficient for melting glasses having $GeO_2$ content not over 85 mole per cent. Batches containing higher $GeO_2$ or $TiO_2$ usually require higher temperatures and longer time of melting than those containing higher alkali fluorides. The melting temperatures for the KF-containing batches are higher than the corresponding NaF-containing ones. Glass containing high germanium dioxide has higher viscosity than those with less. Since sodium fluoride or potassium fluoride melts at a relatively low temperature (992° C. or 857° C., respectively, titanium oxide in the batch has a tendency to sink to the bottom of the liquid at the initial stage of melting. Stirring or shaking is, therefore, essential to facilitate complete solution and reaction of the batch ingredients. At the melting temperature there is some volatilization. This can be eliminated or prevented by the placement of a cover. The glass may be poured to a mold, previously heated to about 420–460° C., and cooled down slowly to room temperatures. A clear and uniform glass is obtained. The glass is durable against moisture attack.

"Vycor," mentioned above, is a trade-mark under which there is commercially available glass having a very high silica content, over 96%. This glass is fully described in the Journal of the American Ceramic Society, October 1, 1944, pages 299–305.

Having thus described my invention, what I claim is:

1. An optical glass resulting from a batch preponderantly of germanium oxide and containing also alkali fluoride and titanium oxide.

2. An optical glass resulting from a batch preponderantly of germanium oxide and containing at least 15 per cent by weight of each of titanium oxide and of fluoride chosen from the fluorides of sodium and potassium.

3. An optical glass resulting from a batch consisting of germanium oxide, 38 to 70 per cent by weight, and equal parts by weight of sodium fluoride and titanium oxide.

4. An optical glass resulting from a batch comprising by weight germanium oxide, at least 38 per cent, titanium oxide, at least 15 per cent, and fluoride chosen from the fluorides of sodium and potassium, at least 15 per cent.

5. An optical glass in which $n_D$ is above 1.70 and $\nu$ is below 28 and resulting from a batch containing by weight alkali fluoride from 15 to 32 per cent; titanium oxide, 15 to 32 per cent; and germanium oxide, over 38 per cent.

6. An optical glass in which $n_D$ is above 1.70 and $\nu$ is below 28 and resulting from a batch consisting of an alkali fluoride 15 to 32 per cent by weight; titanium oxide, 15 to 32 per cent; germanium oxide, over 38 per cent.

KUAN-HAN SUN.